United States Patent Office 3,057,246
Patented Oct. 9, 1962

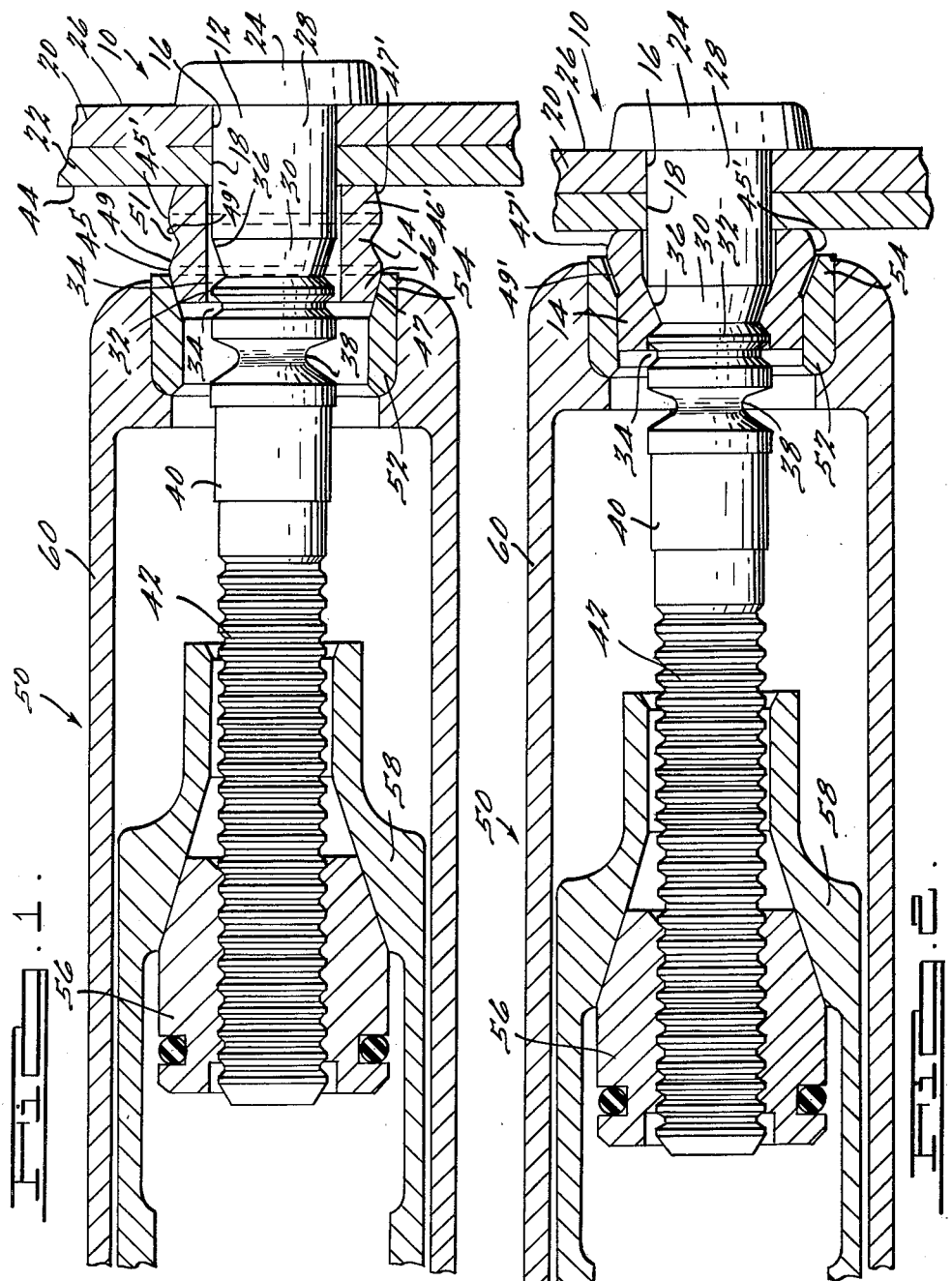

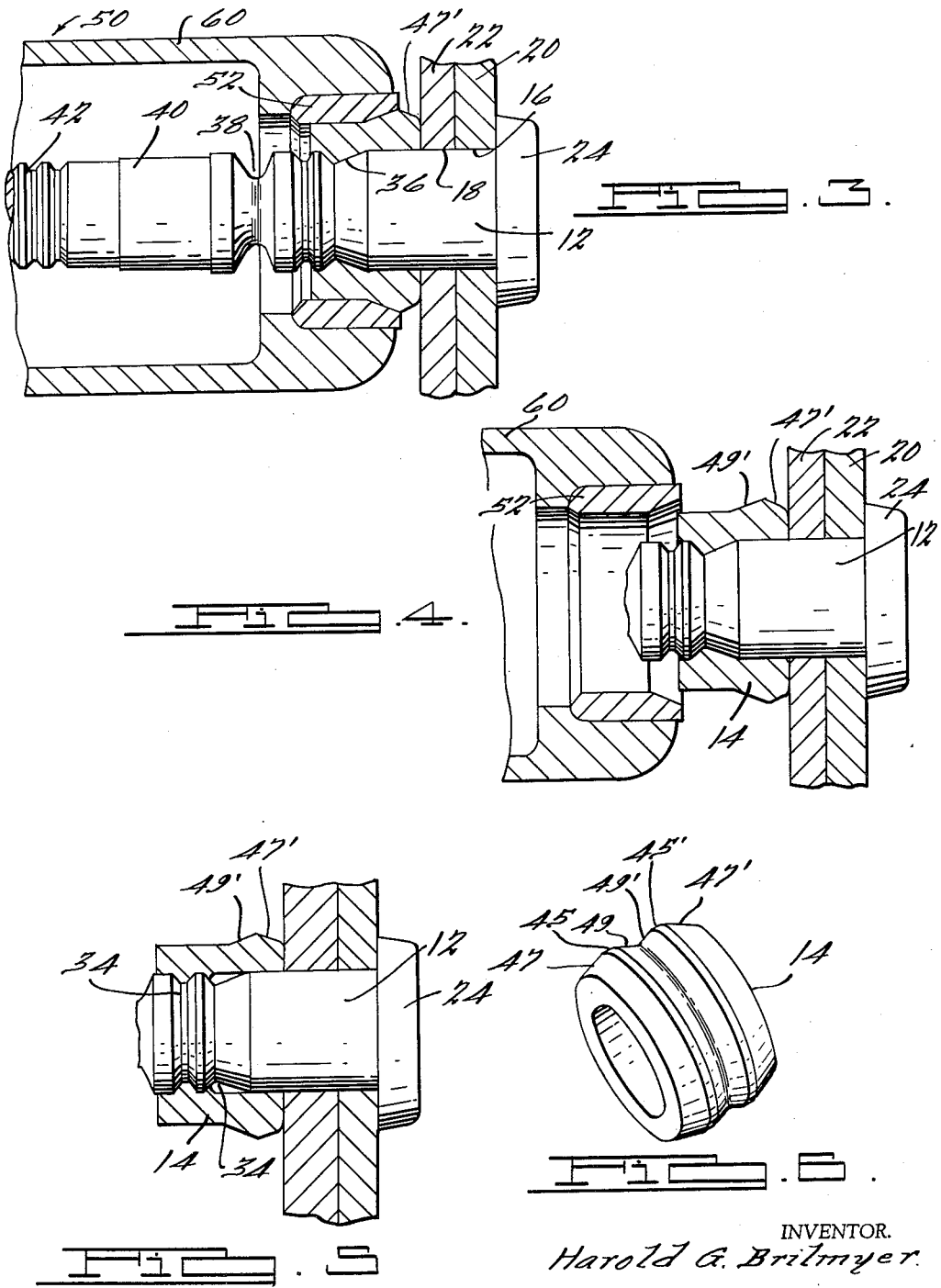

3,057,246
RIVET FASTENER WITH SYMMETRICALLY PROPORTIONED LOCK COLLAR HAVING TOOL ENGAGING STOP MEANS
Harold G. Brilmyer, Grosse Pointe, Mich., assignor to Huck Manufacturing Company, a corporation of Michigan
Filed Nov. 18, 1957, Ser. No. 697,249
3 Claims. (Cl. 85—5)

This invention relates generally to two-part fastening devices and more particularly to an improved fastening device of the type disclosed in Huck U.S. Patent Nos. 2,531,048 and 2,531,049, and generally known as "lockbolts."

The two-part fastener of this invention includes a pin or bolt having a pre-formed head adapted to be inserted from one side of the work and a collar adapted to be positioned over the pin at the opposite side of the work for subsequent swaging or clinching to the pin. The work usually consists of two or more plate or panel members having substantially aligned openings through which the pin extends. The pin head engages the outside surface of one of the plate members and the collar engages the outside surface of the other plate member.

The fastener is set by pulling the pin and applying the reaction force to the collar in substantially the same manner as disclosed in the patents referred to above. After a certain pulling force is reached, the collar is locked to the pin by flowing the collar metal into one or more locking grooves in the pin. However, before a pull of this extent is exerted and thus before any locking of the collar to the pin, the pin is pulled through openings in the plates being pulled together, in some instances with an interference fit, and the pin head is pulled against one side of the work. This characteristic of the fastener in preventing any premature locking of the collar to the pin until the head has been pulled tight and the plates have been pulled tightly together is commonly referred to as "hold-off."

In addition, in those instances in which the plate openings provide for an interference fit for the pin in the openings, the initial pin pull also accomplishes sufficient movement of the pin into the openings to provide for an automatic "hole fill" and movement of the pin head against one side of the work. In other words, before the collar has been swaged sufficiently to bring the inside diameter of the collar into engagement with the locking lands which define the locking grooves in the pin, the plates are pulled tightly together and the openings in the plates are filled by the pin. The final clinching operation provides for a complete swaging of the collar into engagement with the pin at the locking grooves.

An object of this invention is to provide an improved fastener of the above type in which the collar is of a symmetrical shape and can be applied "either end on" to a pin so that the fastener can be used in a fully automated assembly machine.

A further object of this invention is to provide an improved fastener of the above type which has a collar shaped so that the collar by itself provides a stop to limit the pull on the pin head, thus preventing pulling a pin head through or dimpling a thin work sheet.

Another object of this invention is to provide a fastener of the above type in which the collar is shaped to permit of greater tolerances in the manufacture of the pins used with the collar.

Another object of this invention is to provide a fastener of the above type in which the collar is shaped so as to prevent overdriving of the fastener and provide a definite stop indicating a complete swaging of the collar, without having to add excess material to the collar and thus detract from its use in aircraft installations.

Still another object of this invention is to provide a fastener of the above type which is simple in construction, economical to manufacture, and which may be efficiently and economically produced in quantity by a combination cold-heading and rolling process, or a screw machine process.

Further objects, features and advantages of this invention will become apparent from a consideration of the following description, the appended claims and the accompanying drawing in which:

FIG. 1 is a cross sectional view of the fastener of this invention, shown in assembly relation with a pair of plates to be connected and a fragmentary end portion of a pull gun, and illustrating a minimum grip condition for the fastener, namely, the assembly of the fastener with plates of a minimum combined thickness.

FIGS. 2, 3 and 4 are fragmentary sectional views illustrated similarly to FIG. 1 showing the fastener of this invention in successive stages of setting.

FIG. 5 is a view of the fastener of this invention applied to a pair of plates and showing a maximum grip condition for the fastener; and FIG. 6 is a perspective view of the collar in the fastener of this invention.

With reference to the drawing, the fastener of this invention, indicated generally at 10, is illustrated in FIG. 1 as including a pin or bolt 12 provided with a collar 14. The pin 12 is illustrated in FIG. 1 extending through a pair of aligned openings 16 and 18 formed in a pair of plates or panels 20 and 22, respectively, which are to be connected with the fastener 10.

The pin 12 is provided with an integral pre-formed head 24 adapted to engage the adjacent face 26 of the panel 20 with the pin extending through and beyond the openings 16 and 18. The pin 12 has a cylindrical hole-filling portion 28 adjacent the head 24 and a grooved portion 30 adjacent the portion 28. The portion 30 is illustrated as having an annular rib or land 32 with grooves 34 on opposite sides of the rib 32. However, it is to be understood that more or less ribs 32 may be provided depending on the specific use for which the fastener 10 is intended, as will more clearly appear hereinafter. The outer diameter of the rib 32 is slightly less than the outer diameter of the hole-filling portion 28. Between the rib 32 and the portion 28, the shank has a conical taper or shoulder 36.

It is desirable, but not necessary in all applications of the fastener 10, that the plate openings, like the openings 16 and 18, be slightly smaller than the diameter of the cylindrical hole-filling portion 28, but the openings 16 and 18 should in any event be slightly larger than the rib 32 so that the pin 12 can be easily inserted.

The pin has a breakneck 38 of reduced diameter formed adjacent the end of the grooved portion 30, and this breakneck 38 represents the weakest part of the pin 12 so that the pin will break under tension at this point before it will break under tension at any other point. The pin has a cylindrcal portion 40 next to the breakneck 38 which is of a slightly smaller diameter than the rib 32 as shown in FIG. 1. The cylindrical portion 40 terminates at its outer end in a grooved or gripping stem portion 42 which is elongated relative to other portions of the pin 12.

The second part of the fastener 10 consists of the collar 14 which is received over the end of the pin 12 and is located against the adjacent face 44 of the plate 22, as illustrated in FIG. 1. The collar 14 is adapted to be swaged or contracted radially inwardly into the grooves 34 on the pin portion 30 so as to lock the collar 14 to the pin 12 and form what constitutes a fastener head positioned against the plate 22 in the set position of the fastener 10.

The collar 14 is illustrated in FIG. 1 in its initial form, namely, the form of the collar before it is swaged or locked to the pin 12. The collar is generally tubular in shape having a uniform inner diameter, and is provided with a pair of tapered half portions 46 and 46'. As shown in FIG. 1, the inner diameter of the collar is slightly larger than the portions 40 and 42 of the pin 12 and with a predetermined clearance between the inner surface of the collar and the land 32 so that the collar is readily assembled on the pin for movement to the position illustrated in FIG. 1. By virtue of the fact that the half portions 46 and 46' of the collar 14 are identical, the collar may either be placed on the pin 12 as illustrated in FIG. 1 or turned around so that the opposite end of the collar is against the plate 22 since in either event, the collar shape is the same.

Each of the half portions 46 and 46' is formed with a pair of reversely inclined surfaces 47, 47' and 49, 49', respectively, with each pair of inclined surfaces being separated by a thin flat surface 45 and 45', respectively. The inclination of the adjacent surfaces 49 and 49' inwardly toward each other forms a substantially V-shape groove 51 at the middle of the collar 14. The end surfaces 47 and 47' slope toward the collar axis to in effect provide for a decreasing thickness of the collar in directions toward the ends.

The fastener 10 is set by means of a riveting mechanism or gun, of the type shown in my co-pending application, referred to above and shown also in Huck Patents 2,531,048 and 2,531,049, and the nose attachment portion of which is indicated generally at 50 in FIG. 1 for purposes of illustration. The gun attachment 50 includes an anvil 52 having a frusto-conical mouth portion 54 engageable with the adjacent end of the collar 14. The usual gripping jaws 56 are provided on the gun portion 50 for contraction, in response to operation of a jaw contracting and moving sleeve element 58, into gripping engagement with the pin portion 42. When the jaws 56 and the element 58 move to the left, as viewed in FIGS. 1–4, so as to pull the pin, the reaction to this pull is applied through a barrel or sleeve 60, which surrounds the jaws 56 and the element 58, to the anvil 52.

After the pin 12 has been inserted through the aligned openings in the plates 20 and 22, as shown in FIG. 1 the collar 14 is placed over the pin and the riveting mechanism is applied over the pin until the grooved end portion 42 of the pin 12 is gripped by the jaws 56. Initial operation of the pulling mechanism causes the pin to be pulled and the flared mouth portion 54 of the anvil 52 is moved into contact with the adjacent end of the collar 14 so as to press the collar 14 against the plate 22.

With the collar 14 against the plate 22 and the jaws gripping the pin 12, further pull on the pin 12 causes the enlarged hole-filling portion 28 of the pin 12 to draw down to a smaller diameter, or expand the openings 16 and 18, or a combination of both as the pin 12 is moved into and through the openings 16 and 18. Such movement of the pin 12 continues until the head 24 is moved against the adjacent face 26 of the plate 20 as illustrated in FIG. 2. Under certain conditions, it is desirable that the enlarged hole-filling portion 28 of the pin 12 have an interference fit in the openings 16 and 18, as shown in FIGS. 1 and 2, but under other conditions an interference fit may not be necessary or desirable. During the foregoing procedure, the plates 20 and 22, which may be initially spaced, are also pulled tightly together, as shown in FIG. 1. In the FIG. 1 position of the collar 14, it has been moved to a position surrounding the grooved portion 30 of the pin 12.

When the riveting mechanism is actuated to pull the pin 12 and apply the reaction force to the collar 14, the flared mouth 54 of the anvil 52 tends to move over the adjacent end portion 46 of the collar 14. As illustrated in FIGS. 1 and 6, this end portion 46 is annular in configuration and of a progressively increasing diameter in a direction inwardly of the collar. The extent of initial movement of the anvil 52 over the collar 14 depends upon the extent of the resistance to swaging of the collar 14. By virtue of the tapered surface 47, the shape of the end portion 46 is such that the collar 14 exerts the desired initial resistance to swaging. In other words, it is by virtue of this collar end shape that the collar automatically develops the necessary "hold-off" for preventing premature clinching of the collar onto the pin, or holding off initial clinch until the plates 20 and 22 have been drawn tightly together and the desired movement of the pin portion 28 into a hole-filling position has been completed.

The pull on the pin 12 is continued so that the reaction force of the anvil 52 on the collar 14 is increased and the anvil is progressively moved over the collar 14 as illustrated in FIG. 2. In the position of the collar shown in FIG. 2, the inclined surface 47 has been flattened to force the collar material radially inwardly of the surface 47 against the pin 12. The collar 14 is thus swaged into initial contact with the pin at the inner locking groove 34 which is bounded on one side by the inclined shoulder 36, in the minimum grip condition of the rivet 10 shown in FIGS. 1–4, inclusive. As a result, the initial clinching operation has been completed so that any further free movement between the collar 14 and the pin 12 is prevented.

After the primary clinch has been completed, as illustrated in FIG. 2, the anvil 52 continues to move over the collar 14 for completing the swaging of the collar inwardly into locking engagement with the pin at the inner groove 34. Further movement of the anvil 52 swages the inner collar half portion 46' against the pin portion 28 and elongates the portion 46' to apply a tensile pre-load to the pin 12, as shown in FIG. 3. A properly swaged collar 14 is illustrated in FIG. 4 which shows the pin 12 broken at the breakneck 38 and the nose attachment 50 backed off the applied fastener 10, which is illustrated in a minimum grip condition.

As best appears in FIG. 3, the inner half portion 46' functions as a stop, by virtue of the progressive enlargement thereof at the inner inclined surface 49' to prevent further movement of the anvil 52 and consequent stretching of the pin 12 between the locking grooves 34 and the head 24. As a result, further pull on the pin 12 causes increased stretching of the pin at its weakest portion, the breakneck 38. Dimpling of the plate 20 by the head 24 is prevented and the pin is quickly fractured at the breakneck 38. The inclination of the surface 49' in a direction complementary to the inclination of the tapered anvil end portion 54 insures the desired operation of the end portion 46' as a stop.

Furthermore, by virtue of the functioning of the half portion 46' as a stop, greater tolerance is permitted in forming the pin 12 for a predetermined breakneck strength. In the event the pin 12 is formed with above average breakneck strength, the setting of the rivet 10 is not affected since once the anvil 52 contacts the stop surface 49', further pin pull is directed mainly toward fracturing the pin at the breakneck. The collar stop also prevents a malfunctioning of the rivet 10 which sometimes occurs in similar rivets in which, in cases of high pin break, the gun anvil reacts against the work and loosens the fastening to an extent relieving the previously applied tensile pre-load. The stop effectively prevents any over-driving of the rivet and serves as a marker so that a complete swage is consistently obtained.

In the maximum grip condition for the rivet 10 illustrated in FIG. 5, the collar is completely swaged into the outer locking groove 34 and partially into the inner groove 34. In all other respects the rivet application is the same as described above in connection with a minimum grip.

From the above description, it is seen that this invention provides a fastener 10 consisting of a pin 12 and a collar 14 assembled in a predetermined relation with the pin 12. By virtue of the specific shape of the collar 14 so that the collar is symmetrical with respect to a first axis extended axially of the collar, and a second axis extended diametrically of the collar at a position midway between the ends thereof, the collar has identical ends so that it does not have to be examined before it is placed on the pin 12. In other words, it does not have a front end and a rear end as is customary in collars of this type, as illustrated, for example, in Huck Patents Nos. 2,531,048 and 2,531,049. However, it has the advantage of being a collar which will automatically provide its own "hold-off" characteristics as well as relief against excessive tension loads on the pin during swaging. The fastener 10 is particularly adapted for soft metal applications in which it is subjected principally to shear, rather than tension, loads.

The collar of the present invention also has the advantages outlined when applied to a pin known as a stump, i.e., a pin like the illustrated pin 12 but without the pull grooves and the breakneck.

Although the invention has been described with respect to a preferred embodiment thereof, it is to be understood that it is not to be so limited, since changes can be made therein which are within the scope of the invention as defined by the appended claims.

What is claimed is:

1. A fastener for use in attaching together a pair of members having aligned openings, said fastener comprising a pin adapted to extend through said openings and having a head for engaging the outer side of one of said members, an externally grooved portion next to the cylindrical portion adapted to be located substantially at the outer side of the other one of said members and providing locked grooves, a stem portion at the end of said pin opposite the head for adapting the pin for gripping and pulling, and a collar positioned on the pin over said stem end and adapted to be swaged into the grooves when the fastener is set by pulling said pin and moving a swaging tool longitudinally of said collar for maintaining one end of the collar against said outer side of said other one of said members, said collar comprising a tubular member having a substantially uniform internal diameter and symmetrical end portions, each of said end portions being formed of gradually increasing wall thickness from the ends thereof toward the center of the collar and an intermediate reduced wall thickness portion between said end portions, the gradually increasing wall thickness of one end portion of said collar providing a hold-off angle engageable by said tool and the increased wall thickness of the opposite end adjacent the intermediate reduced wall thickness portion providing a stop abutment engageable by said tool at the completion of swage to thereby increase the pulling load to cause separation of said stem beyond said collar.

2. A fastener for use in attaching together a pair of members having aligned openings, said fastener comprising a pin having a head for engaging the outer side of one of said members, said pin having an externally grooved portion adapted to be located substantially at the outer side of the other one of said members and providing locking grooves, and a fastener collar positioned in embraceable relation with said pin portion and adapted to be swaged into locking engagement with said grooved portion when a swaging tool is moved longitudinally of said collar toward said pin head, said collar having a central opening through which said pin is extended and being adapted to have one end engage said other one of said members, said collar having identical half portions, each of said half portions being of a progressively reduced outside diameter from a central portion of each half portion toward the ends of each half portion so that when one end of said collar is engaged with the other one of said members the inner part thereof constitutes a stop surface inclined radially outwardly of said collar in a direction toward said one end, said stop surface being engageable with a swaging tool after the first portion of said collar has been swaged inwardly to limit movement thereof longitudinally of said collar for obtaining a predetermined swaging of said collar and predetermined extension of said pin between said collar and pin head to thereby increase the pulling load to cause separation of said stem beyond said collar.

3. A fastener for use in attaching together a pair of members having aligned openings, said fastener comprising a pin having a head for engaging the outer side of one of said members, said pin having an externally grooved portion adapted to be located substantially at the outer side of the other one of said members and providing locking grooves, a stem portion at the end of said pin opposite the head for adapting the pin for gripping and pulling, and a collar positioned on the pin over said stem end in embraceable relation with said pin and adapted to be swaged into locking engagement with said grooved portion when a swaging tool is moved longitudinally of said collar toward said pin head, said collar having a central opening through which said pin is extended and being symmetrical relative to an axis extending diametrically thereof at a position midway between the collar ends, said collar having outer surface portions at the ends thereof inclined inwardly to progressively reduce the outer diameter of the collar toward the ends thereof and having a substantially V-shape groove formed in the outer surface thereof between said surface portions, one of said outer surface portions providing a hold-off surface when engaged by said swaging tool to prevent premature swaging and the opposite surface defined by the V-shaped groove providing a stop abutment when engaged by said swaging tool to thereby increase the pulling load to cause separation of said stem beyond said collar.

References Cited in the file of this patent

UNITED STATES PATENTS

| | | |
|---|---|---|
| 1,489,065 | Clifton | Apr. 1, 1924 |
| 2,355,580 | Wing | Aug. 8, 1944 |
| 2,381,554 | Norgren | Aug. 7, 1945 |
| 2,395,667 | Keller | Feb. 26, 1946 |
| 2,467,610 | Cherry | Apr. 19, 1949 |
| 2,764,045 | Koenig | Sept. 25, 1956 |

FOREIGN PATENTS

| | | |
|---|---|---|
| 588,288 | Great Britain | May 19, 1947 |

UNITED STATES PATENT OFFICE

CERTIFICATE OF CORRECTION

Patent No. 3,057,246

October 9, 1962.

Harold G. Brilmyer

It is hereby certified that error appears in the above numbered patent requiring correction and that the said Letters Patent should read as corrected below.

Column 5, line 33, for "locked" read -- locking --; column 6, list of references cited, under "UNITED STATES PATENTS" add the following:

348,426 Shellenberger ------- Aug. 31, 1886
2,114,493 Huck ---------------- Apr. 19, 1938
2,531,048 Huck ---------------- Nov. 21, 1950

Signed and sealed this 26th day of February 1963.

(SEAL)
Attest:

ESTON G. JOHNSON
Attesting Officer

DAVID L. LADD
Commissioner of Patents